United States Patent [19]

Iida et al.

[11] Patent Number: 5,546,919

[45] Date of Patent: Aug. 20, 1996

[54] OPERATING ARRANGEMENT FOR GASEOUS FUELED ENGINE

[75] Inventors: Yoshikatsu Iida; Noriyuki Kurihara; Toshio Suzuki, all of Iwata, Japan

[73] Assignee: Yamaha Hatsudoki Kabushiki Kaisha, Iwata, Japan

[21] Appl. No.: 297,393

[22] Filed: Aug. 29, 1994

[30] Foreign Application Priority Data

Aug. 31, 1993 [JP] Japan .................................. 5-216379
Aug. 31, 1993 [JP] Japan .................................. 5-216380

[51] Int. Cl.$^6$ ................................................ F02D 41/00
[52] U.S. Cl. ........................................................ 123/682
[58] Field of Search .................................. 123/682, 585, 123/277, 679, 680, 681, 685, 688, 699, 700, 701, 702, 525, 527; 60/276, 277, 285

[56] References Cited

U.S. PATENT DOCUMENTS

| | | | |
|---|---|---|---|
| 3,996,908 | 12/1976 | Brown, III et al. | 123/124 |
| 3,996,909 | 12/1976 | Fischer | 123/124 |
| 4,089,311 | 5/1978 | Brettschneider et al. | 123/119 |
| 4,216,757 | 8/1980 | Romann | 123/179 |
| 4,285,700 | 8/1981 | Fox | 48/180 |
| 4,347,824 | 9/1982 | Pierson | 123/527 |
| 4,369,749 | 1/1983 | Sugi | 123/439 |
| 4,385,613 | 5/1983 | Yoshida et al. | 123/489 |
| 4,404,947 | 9/1983 | Swanson | 123/527 |
| 4,413,607 | 11/1983 | Batchelor et al. | 123/590 |
| 4,457,279 | 7/1984 | Teramura et al. | 123/439 |
| 4,472,808 | 5/1988 | Blumel et al. | 123/489 |
| 4,485,792 | 12/1984 | van der Weide | 123/527 |
| 4,492,204 | 1/1985 | Bertsch et al. | 123/489 |
| 4,492,205 | 1/1985 | Jundt et al. | 123/489 |
| 4,517,134 | 5/1984 | Nakamura et al. | 261/39 A |
| 4,528,957 | 7/1985 | Jundt et al. | 123/440 |
| 4,541,397 | 9/1985 | Young | 123/527 |
| 4,545,350 | 10/1985 | Nakamura et al. | 123/439 |
| 4,554,896 | 11/1985 | Sougawa | 123/179 |
| 4,572,149 | 2/1986 | Hasegawa et al. | 123/589 |
| 4,589,397 | 5/1986 | Stankewitsch | 123/590 |
| 4,606,319 | 8/1986 | Silva | 123/525 |
| 4,628,883 | 12/1986 | Kataoka | 123/489 |
| 4,638,783 | 1/1987 | Snyder | 123/527 |
| 4,686,951 | 8/1987 | Snyder | 123/527 |
| 4,696,278 | 9/1987 | Ito et al. | 123/493 |
| 4,699,630 | 10/1987 | Lee et al. | 48/180.1 |
| 4,719,888 | 1/1988 | Kobayashi et al. | 123/683 |
| 4,774,909 | 10/1988 | Dolderer | 123/1 A |
| 4,813,390 | 3/1989 | Bennett | 123/577 |
| 4,813,394 | 3/1989 | St. Clair | 123/527 |
| 4,829,957 | 5/1989 | Garretson et al. | 123/27 GE |
| 4,834,050 | 5/1989 | Uranishi et al. | 123/440 |

(List continued on next page.)

FOREIGN PATENT DOCUMENTS

| | | | |
|---|---|---|---|
| 0346989 | 12/1989 | European Pat. Off. | 123/520 |
| 0510585 | 10/1992 | European Pat. Off. | 123/520 |
| 0575939 | 12/1993 | European Pat. Off. | 123/520 |
| 3321424 | 8/1984 | Germany | 19/2 |
| 0217747 | 12/1983 | Japan . | |
| 0176444 | 10/1984 | Japan . | |
| 1327513 | 8/1973 | United Kingdom | 21/4 |

OTHER PUBLICATIONS

European Search Report.
European Search Reported dated Oct. 2, 1993.

Primary Examiner—Raymond A. Nelli
Attorney, Agent, or Firm—Knobbe, Martens, Olson & Bear

[57] ABSTRACT

A feedback control system for a gaseous fuel supplied internal combustion engine wherein the air-fuel ratio is maintained at a stoichiometric ratio by mixing air with the gaseous fuel supply to the charge former. A manually controlled air bleed is incorporated to permit adjustment for deterioration in the system due to age or carbon deposits or the like. In addition, the feedback control position of the air bleed valve is memorized, and the memorized value is utilized for control under some conditions when feedback control would not be appropriate, such as for cold starting when the sensor is not at its operating temperature or upon the resumption of normal control after a fuel shutoff during decell.

40 Claims, 4 Drawing Sheets

U.S. PATENT DOCUMENTS

| | | | |
|---|---|---|---|
| 4,841,940 | 6/1989 | Uranishi et al. | 123/520 |
| 4,843,558 | 6/1989 | Bergmann et al. | 364/431.03 |
| 4,858,583 | 8/1989 | Sonntag | 123/527 |
| 4,864,991 | 9/1989 | Snyder et al. | 123/344 |
| 4,867,127 | 9/1989 | Quirchmayr et al. | 123/527 |
| 4,870,933 | 10/1989 | Mizuno | 123/325 |
| 4,915,081 | 4/1990 | Fujimoto et al. | 123/489 |
| 4,938,199 | 7/1990 | Sato et al. | 123/585 |
| 4,953,516 | 9/1990 | van der Weide et al. | 123/527 |
| 4,970,858 | 11/1990 | Matsuoka | 60/274 |
| 5,014,688 | 5/1991 | Klenk et al. | 123/399 |
| 5,058,556 | 10/1991 | Fukuma et al. | 123/489 |
| 5,076,245 | 12/1991 | Jones | 123/527 |
| 5,101,799 | 4/1992 | Davis et al. | 123/527 |
| 5,150,673 | 9/1992 | Hoshiba et al. | 123/179.15 |
| 5,150,690 | 9/1992 | Carter et al. | 123/527 |
| 5,172,678 | 12/1992 | Suzuki | 123/688 |
| 5,201,173 | 4/1993 | Fujimoto et al. | 60/277 |
| 5,337,722 | 8/1994 | Kurihara et al. | 123/527 |
| 5,357,938 | 10/1994 | Bedford et al. | 123/685 |

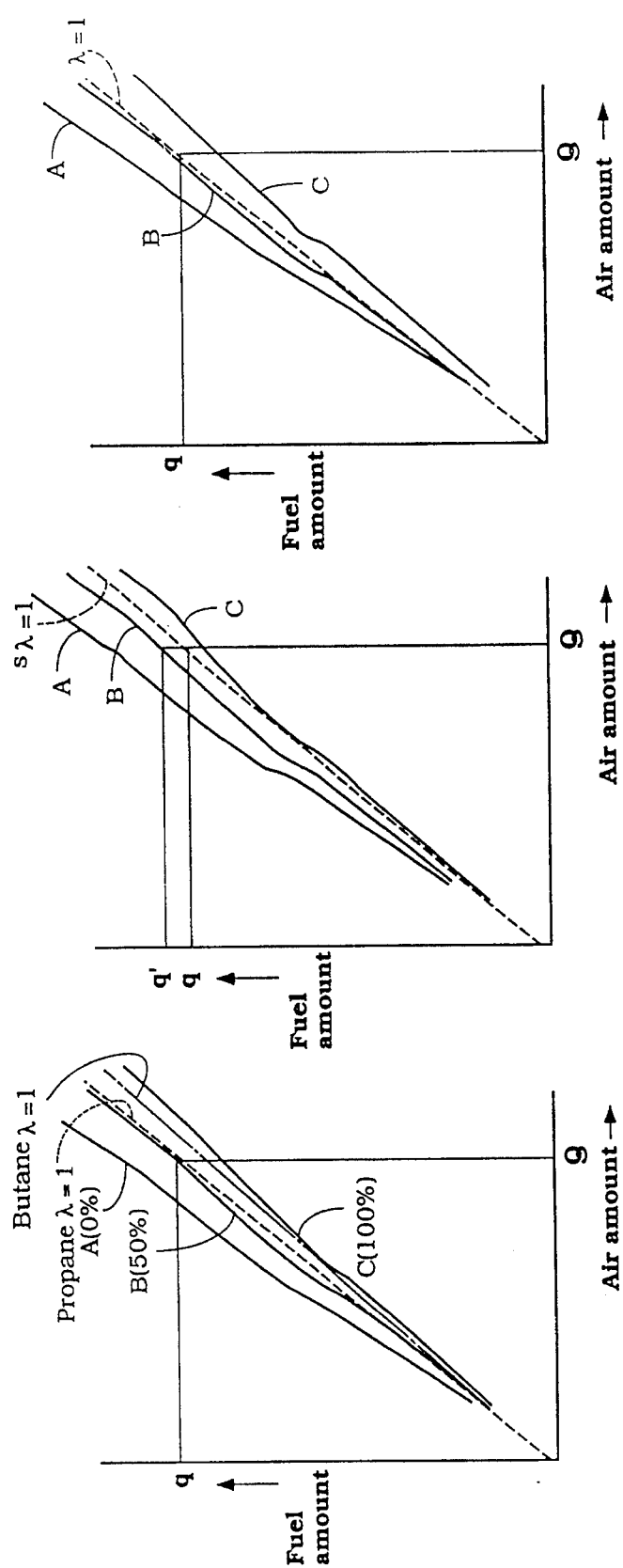

5,546,919

OPERATING ARRANGEMENT FOR GASEOUS FUELED ENGINE

BACKGROUND OF THE INVENTION

This invention relates to an operating arrangement for a gaseous fueled engine, and more particularly to an improved apparatus and method for operating an engine on liquid petroleum gas (gaseous fuel) to provide good emission control and uniform running under a wide variety of conditions and during a long period without necessitating major servicing.

In the interest of conserving natural resources and still further reducing the emission of unwanted constituents to the atmosphere from the exhaust of internal combustion engines, renewed interest is being shown in the operation of the engines on other forms of fuel than gasoline. The advantages of operation on gaseous fuels (LPG) is again being investigated as a possible source of achieving these goals.

In one successful arrangement for operating an engine on gaseous fuels, the engine is supplied with a charge former, which mixes the gaseous fuel with the atmospheric air and supplies it to the engine. The charge former has one or more control circuits, specific examples of which will be described later, for providing the desired fuel-air ratio in response to the engine running conditions. In addition, a feedback control system is employed using an exhaust sensor so as to ensure that the engine is always operating at a stoichiometric condition, sometimes referred to as $\lambda=1$. The value of $\lambda$ is arrived at by taking the actual fuel-air ratio at which the engine is running and dividing it by the ideal stoichiometric ratio at the same running condition. Frequently, an oxygen sensor is employed in the exhaust system for providing this feedback control.

The output of the exhaust sensor is transmitted through a CPU to a device for making fine adjustments in the fuel-air ratio. One way in which this is done is by bleeding air into the source of gaseous fuel supplied to the circuits of the charge former.

The value of using a so-called "air valve" carburetor in conjunction with such engines has also been acknowledged. Such carburetors employ a throttle valve in the induction system, which moves to a position to maintain the desired pressure ratio across the throttle valve. The throttle valve is then coupled by some means such as a linkage system or the like to a metering circuit of the fuel supply so that the fuel-air ratio is maintained appropriately for the engine running condition.

As noted above, superimposed upon this charge-forming system is a feedback control system that operates a bleed control valve for sufficient air into the fuel circuits to maintain the $\lambda 1$ condition. An example of a system operating on this principle is shown in the United States Letters Patent entitled "Fuel Control and Feed System for Gas-Fueled Engine," U.S. Pat. No. 5,337,772 issued on Aug. 16, 1994, which patent is assigned to the Assignee hereof.

In connection with the use of the feedback control, the air bleed control valve is of a type that is operated by a stepping motor. The position of the stepper control is correlated by the electronic control to maintain the desired $\lambda 1$ condition. In order to assure a good range of adjustment, the initial setting of the air bleed valve is normally chosen for a given steady-state condition to be one-half of its total range of operation. For example, if the stepper motor moves through 100 steps from a fully closed position where there is no air bleed and fuel feel and a fully opened position where there is maximum air bleed and fuel dilution in 100 steps, the initial stepping will be at the 50-step position, with adjustments being made is either to maintain the necessary $\lambda 1$ condition.

However, even though there is an automatic feedback control, the condition of the various components may change with either time or for other reasons such as deterioration of certain components in the system due to carbon deposit, etc. The feedback control system will, of course, maintain the $\lambda 1$ condition, but the initial setting of the stepper motor may thus necessitate deviation from the standard 50-step position to another position such as, for example, a 70-step position. Therefore, the range of leaning the mixture will be decreased when this situation occurs because there will only remain 30 steps for leaning. Of course, the drift may occur in the other direction, and thus limit the amount of enriching that is possible.

It is, therefore, a principal object of this invention to provide an improved operating arrangement and fuel control system for a gaseous fueled engine wherein an arrangement is provided for permitting adjustment of the air bleed to accommodate for changed conditions in the engine and its components without necessitating a change in the position of the computer-controlled air bleed circuit.

It is a further object of this invention to provide an improved and simplified arrangement for a gaseous fueled engine that can accommodate for drift from normal condition due to wear, failures, etc.

As has been previously noted, various types of sensors may be employed in the exhaust system to provide the necessary signal to provide the required feedback control. The most common sensor employed is an oxygen ($O_2$) sensor. Although $O_2$ sensors are extremely effective, they do have some disadvantages. For example, the normal oxygen sensor only outputs a signal when the $\lambda 1$ condition is exceeded. In addition, the oxygen sensors also do not provide a signal until they reach an operating temperature, normally something in the range of 350° C. As a result, the electronic control or computer must be programmed so as to afford a control for the fuel-air ratio under conditions when the sensor is not outputting a signal either because it is not at an operating temperature, because it is not possible to determine whether it is not at an operating temperature or the engine is running lean, or because the sensor may actually fail.

It is, therefore, a still further object of this invention to provide an improved operating arrangement for a gaseous fueled engine wherein a control routine is established for conditions when feedback control is not possible.

SUMMARY OF THE INVENTION

A first feature of this invention is adapted to be embodied in a gaseous fueled engine and method for operating such an engine which has an induction system, including a charge former for supplying a fuel-air mixture to the engine and which comprises an air induction passage for receiving atmospheric air and a fuel supply circuit for receiving gaseous fuel from a source of gaseous fuel stored under pressure and mixing the fuel with the air in the induction passage for forming a fuel-air mixture for the engine. An air bleed passage communicates atmospheric air with the fuel supply circuit, and an automatic air bleed valve is provided in said air bleed passage for controlling the amount of air bled into the fuel supply circuit to control mixture strength.

An engine combustion sensor is provided for determining the fuel-air ratio, and feedback control means operate the automatic air bleed valve to maintain the desired ratio.

In accordance with a first apparatus for practicing the invention, an arrangement is provided for providing a supplemental air bypass system for bleeding a controlled amount of additional air into the fuel supply independently of that provided by the automatic air bleed valve.

In accordance with a method for operating such an engine and incorporating a feature of the invention, a controlled amount of air is bled into the fuel supply independently of the automatic air bleed to compensate for deterioration in components of the system and/or engine.

In accordance with an apparatus for performing a further feature of the invention, the control for controlling the charge-forming system includes a memory for memorizing the feedback control signal determined from the outputs of the sensor during previous engine running conditions and for employing the memorized data to set the amount of automatic air bleed under conditions when the combustion sensor is not outputting a signal which may be reliable for feedback control.

In accordance with a method for practicing another feature of the invention, the output signal of the feedback control from previous engine cycles is memorized in relation to engine running conditions, and if it is sensed that the engine combustion sensor may not be outputting reliable signals, the automatic air bleed valve is controlled in response to the memorized signals for the actual engine running conditions.

BRIEF DESCRIPTION OF THE DRAWINGS

FIG. 3 is a graphical view showing the fuel volume flow versus air intake volume for the design specification engine employing either a butane-type fuel, as shown by the dot-dash line, or a propane-type fuel, as shown by the broken line.

FIG. 4 is a graphical view, in part similar to FIG. 1, and shows the condition of one way in which the system may deteriorate due to age and using the example of operation on propane fuel.

FIG. 5 is a graphical view, in part similar to FIGS. 3 and 4, and shows how the system can be returned to normal by manual adjustment.

DETAILED DESCRIPTION OF THE PREFERRED EMBODIMENTS OF THE INVENTION

Figure 1:
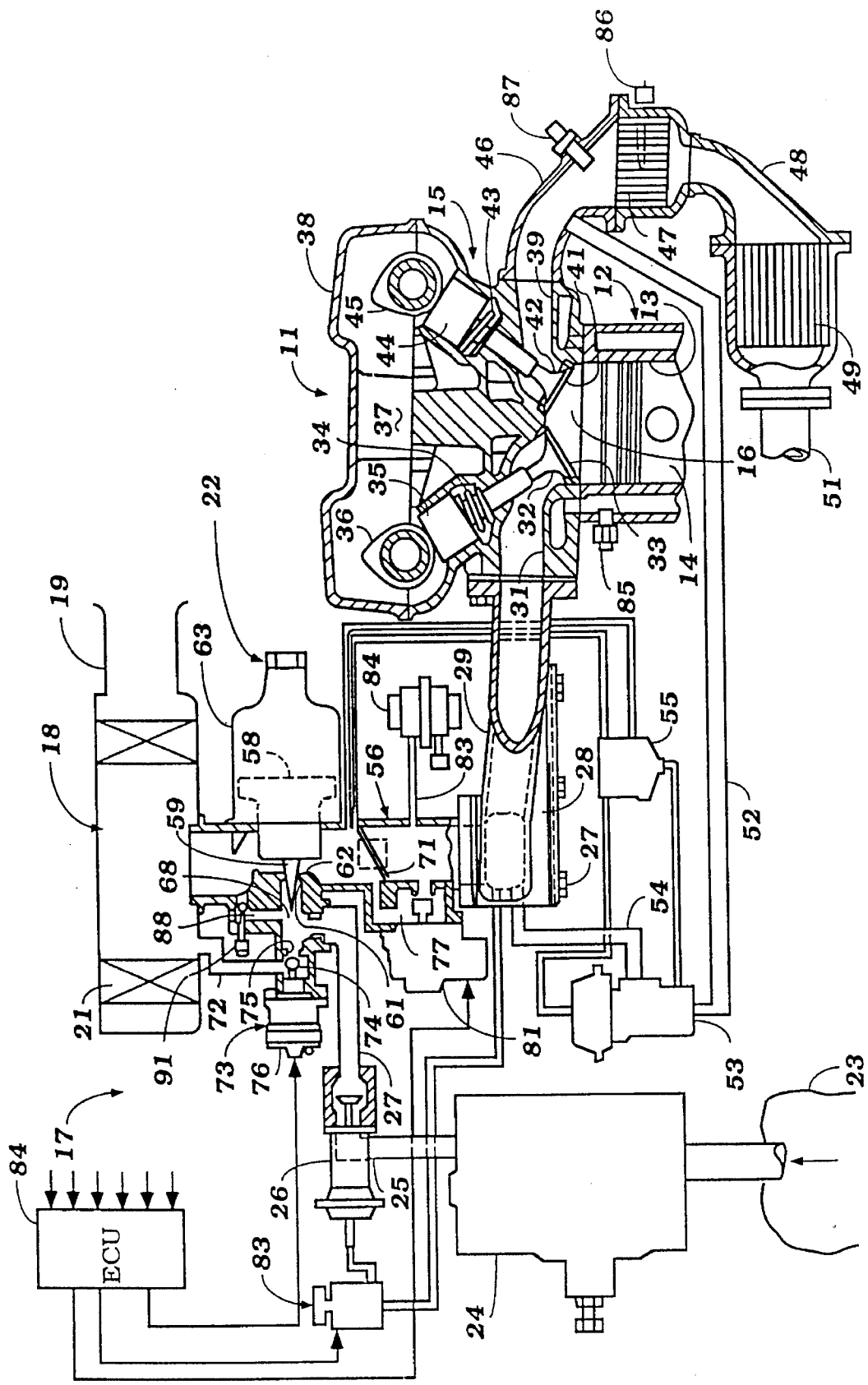
FIG. 1 is a partially schematic cross-sectional view taken through portions of an internal combustion engine constructed and operated in accordance with an embodiment of the invention.

Referring now in detail to the drawings and initially primarily to FIG. 1, an internal combustion engine constructed in accordance with an embodiment of the invention is shown partially and is identified generally by the reference numeral 11. The engine 11 is depicted only partially and by way of a cross-sectional view through a single cylinder because the invention deals primarily with the charge-forming system for the engine and its control. Therefore, when any details of the engine 11 are not described, they may be considered to be of any conventional type as well known in this art.

For reference purposes, the engine 11 is comprised of a cylinder block, indicated generally by the reference numeral 12, which in the illustrated embodiment is of the in-line multiple cylinder type and has cylinder bores 13 formed in the cylinder block 12. Although the invention is described in conjunction with an in-line engine, it will be readily apparent to those skilled in the art how the invention can be employed with engines having other cylinder configurations. Furthermore, although the invention is described in conjunction with a four-cycle reciprocating engine, it should be readily apparent to those skilled in the art that the various features of the invention can also be employed with engines operating on a two-stroke principle or engines operating on other principles and engines other than reciprocating engines, such as rotary engines.

Pistons 14 are slidably supported within the cylinder bores 13 and are connected in a well-known manner by connecting rods to a crankshaft (not shown). Since the invention deals primarily with the induction system for the engine and the associated exhaust system and feedback control, the lower end of the engine 11 has not been depicted in the drawings.

A cylinder head assembly 15 is affixed to the cylinder block 12 in a known manner and has individual recesses 16 which cooperate with the cylinder bores 13 and pistons 14 to form the individual combustion chambers of the engine. An induction and exhaust system, to be described, is formed in the cylinder head assembly 15 for delivering a combustible mixture to the combustion chambers 16, firing them and exhausting the burned charge to the atmosphere.

The induction system, in accordance with an embodiment of the invention, is identified generally by the reference numeral 17 and will be described in more detail later by reference to FIG. 2. However, the induction system 17 includes an air cleaner 18 having an atmospheric air inlet 19 through which atmospheric air is drawn and a filter element 21 for filtering foreign particles from the inducted air.

This air is then delivered to a charge former, indicated generally by the reference numeral 22, and which has a construction as will be best described by reference to FIG. 2. This charge former 22 receives a gaseous fuel from a source of such fuel under pressure, normally stored as a liquid, which is shown partially and as identified by the reference numeral 23. The gaseous fuel is delivered to a pressure regulator 24 that reduces the pressure in two stages to a pressure less than atmospheric, as described in the aforenoted patent and is then delivered through a conduit 25 to a deceleration fuel shut-off valve 26. The deceleration shut-off valve 26 is operated in a manner that will be described later. From the shut-off valve 26, the fuel is delivered to the fuel discharge circuit or circuits of the charge-forming device 22, and the manner in which this is done will be described later in more detailed reference to FIG. 2.

Continuing on to describe the induction system 17, the fuel-air mixture that has been formed by the carburetor 22 is then delivered to an intake manifold, indicated generally by the reference numeral 27, and more specifically to a plenum chamber 28 formed at the inlet thereof. The inlet manifold 27 has a plurality of runners, one being shown in FIG. 1 and is identified by the reference numeral 29, that communicate with intake passages 31 formed in the cylinder head 15 at one side thereof in a well-known manner.

In the illustrated embodiment, each combustion chamber 16 is provided with two intake valves 32 and which are served by respective intake passages 31 or by a Siamesed intake passage. These intake valves 32 cooperate with respective valve seats 33 formed in the cylinder head 15 to control the communication with the combustion chamber 16. Coil compression springs 34 normally urge the intake valves 32 to their closed position. Thimble tappets 35 are slidably supported within the cylinder head 15 and are operated by the lobes of an intake camshaft 36 for opening the intake valves 32 in a well-known manner.

The intake camshaft 36 is driven from the crankshaft of the engine at one-half crankshaft speed, as is well known in this art. The camshaft 36 is contained within a cam chamber 37 formed at the upper end of the cylinder head 15 and which is enclosed by a cam cover 38 in a well-known manner.

The combustible charge which is delivered to the combustion chamber 16 by the induction system as thus far described is then fired by one or more spark plugs mounted in the cylinder head 15 in a well-known manner. This charge can then exit the combustion chambers through exhaust passages 39 formed in the cylinder head 15 on the side opposite the intake passages 31. Valve seats 41 are provided at the combustion chamber side of the exhaust passages 39, and the flow through them is controlled by a pair of exhaust valves 42 also mounted in the cylinder head 15 on this side of the engine. Coil compression springs 43 urge the exhaust valves 42 to their closed position.

Thimble tappets 44 are slidably supported within the cylinder head 15 and are operated by means of the lobes of an exhaust camshaft 45 that is journaled in the cam chamber 37 and driven at one-half camshaft speed along with the intake camshaft 36 by any known type of cam drive. It should be noted that although the invention is described in conjunction with a four-valve-per-cylinder engine, the invention can be utilized with engines of the four-cycle type having other valving arrangements. As has already been noted, the invention can also be employed with ported or rotary engines.

An exhaust manifold 46 is affixed to the exhaust side of the cylinder head 15 and registers with the exhaust passages 39 for collecting the exhaust gases and discharging them to a common outlet in which a first catalyst bed 47 of any desired type may be positioned. It is desirable to maintain the first catalyst bed as close to the exhaust passages 39 as possible so as to ensure rapid heating of the catalyst bed 47 and effective operation thereof.

An exhaust pipe 48 communicates with the downstream side of the catalyst bed 47 and with the upstream side of a second catalyst bed 49, which may also be of any known type. The catalyst bed 49 discharges the exhaust gases to the atmosphere through an exhaust system which may include one or more mufflers and which is shown only partially and is identified generally by the reference numeral 51.

In order to control certain emissions, for example, those of nitrous oxides or the like, an exhaust gas recirculation system is also incorporated, which includes an EGR line 52 that is tapped off of the exhaust manifold 46 and which delivers the exhaust gases to an EGR valve 53. The EGR valve 53 selectively returns a portion of the exhaust gases to the engine through its induction system by discharging the exhaust gases through a conduit 54 into the plenum chamber 28 of the intake manifold 27. An EGR control 55 of any known type operates the EGR valve 53 to provide the desired strategy for control.

The engine 11 and auxiliaries as thus far described may be considered to be conventional, and for that reason, further details of the conventional components of the engine are not believed to be necessary to permit those skilled in the art to understand and practice the invention.

The charge-forming device or carburetor 22, which forms an important portion of the invention, is depicted in more detail in FIG. 2 and will now be described in more detail by reference to that figure. The carburetor 22 includes a main body assembly 56 that forms an induction passage 57, which communicates at its inlet end with the air cleaner 18 and at its outlet end with the plenum chamber 28 of the intake manifold 27.

The carburetor 22 is of the constant depression or air valve type and includes a sliding piston 58 that has an end portion which carries a metering rod 59 that is received within a metering jet 61 formed in a portion 62 of the induction passage 57 in confronting relation to the sliding piston 58. The piston 58 is received within a housing assembly 63 and defines a first chamber A that is exposed to the pressure at the throat of the carburetor 22 defined by the sliding piston 58 and induction passage portion 62 through a bleed opening 64. A coil compression spring 65 is received in the chamber A and normally urges the sliding piston 58 to a direction to restrict the cross-sectional area of the throat.

The remaining chamber B defined by the piston 58 and housing 63 is exposed to atmospheric air pressure through an atmospheric air pressure port 66 which actually faces the inner side of the air cleaner 18 and thus senses the pressure of the air that will be introduced into the induction passage 57. As is well known in this art, the piston 58 will move to a position dependent upon the pressure difference to maintain a substantially constant pressure drop across the throat of the carburetor 22. At the same time, the amount of fuel metered by the metering rod 59 will vary depending upon the piston position.

As has been noted, fuel from the source 23 is provided to the fuel discharge circuit of the carburetor 22 from the shut-off valve 26. This shut-off valve delivers the fuel to a conduit 67, which communicates with a mixing chamber 68 formed at the base of the metering jet 61. The conduit 67 is provided with a metering orifice 69 that leads to the mixing chamber 68 for controlling the amount of fuel which can enter the chamber 68.

A throttle valve 71 is positioned in the induction passage 57 downstream of the sliding piston 58 and is connected in a well-known manner to a remotely positioned operator-controlled throttle.

As will become apparent, the metering jet 61 and metering rod 59 provide the desired fuel-air ratio under substantially all engine running conditions. However, fine-tuning adjustment is made by a feedback control system, which will be described, but which includes an air bypass system for bleeding controlled amount of air into the mixing chamber 68 for providing fine tuning of the air-fuel ratio so as to ensure that the engine runs on a stoichiometric condition under all running conditions.

This system includes an air bleed passage 72 which extends from the air filter 18 downstream of the filter element 21 to an automatic air bleed valve, indicated generally by the reference numeral 73, and which includes a valving element 74 that cooperates with a metering orifice 75 so as to control the flow of air into the mixing chamber 68. The valve element 74 is controlled by a servo or stepper motor 76 which operates in step increments so as to control the degree of closure of the orifice 75 and, accordingly, the amount of air bled into the mixing chamber 68 for fine tuning of the mixture strength to maintain a λ1 condition.

Although idle speed of the engine 11 can be controlled by controlling the position of the throttle valve 71 at idle, a more accurate idle control is provided by an idle bypass circuit 77 which is formed in the carburetor body 56 and which extends from a position slightly above the idle position of the throttle valve 71 to a position below it defined by an idle discharge orifice 78. An idle control valve 79 is operatively connected to a further, idle stepper motor 81, which is controlled so as to provide control of the idle speed of the engine without necessitating adjustment of the idle speed of the throttle valve 71.

The remaining components of the charge-forming system and the controls therefor will now be described primarily by reference to FIG. 1. It has been noted that the fuel shut-off valve 26 is provided in the fuel supply circuit for the charge former 22. This shut-off valve is closed under extreme deceleration conditions so as to avoid fuel being drawn into the engine through its induction system when it acts like a pump on extreme deceleration.

Therefore, there is provided an intake manifold vacuum sensor 82 that has a pressure conduit 83 to sense the pressure in the induction system downstream of the throttle valve 71. During extreme decelerations, there will be a large manifold vacuum exerted, and this, coupled with other factors, can be employed as a condition for shutting off the fuel supply valve 26. This is done by means of a decell shut-off control 83 that is operated by an ECU 84, which controls a number of engine functions and which receives a number of input signals from various sensors, some of which will be described.

It should be understood that although certain types of sensors are to be described, it will be obvious to those skilled in the art how other parameters may also be employed for engine control. When the extreme deceleration condition is sensed, the ECU 84 outputs a signal to the decell shut-off control 83, which, in turn, actuates a vacuum motor in the shut-off valve 26 to discontinue the supply of fuel from the pressure regulator 24 to the mixing chamber 68 of the fuel discharge circuit of the carburetor 22.

Among the other sensors which may be employed for sending signals to the ECU 84 for various engine control functions is a water-temperature sensor 85 that is tapped into the cooling jacket of the cylinder block 12 and which outputs a signal indicative of engine water temperature. In addition, a temperature probe 86 extends into at least the catalyst bed 47 to provide a signal indicative of its temperature.

The important control for the charge-forming system which entails the invention is the use of an exhaust sensor 87, which in the illustrated embodiment is an oxygen ($O_2$) sensor that is placed into the exhaust manifold 46 upstream of the first catalyst bed 47. This oxygen sensor, as is typical with this type of sensor, will only output a signal when the oxygen condition is above a certain level, and this occurs when the air-fuel ratio mixture A/F is richer than the stoichiometric desired air-fuel ratio, a detection signal will be outputted. These sensors do not become operative until they are at more than a certain temperature, such as 350° C., and hence, the sensor 87 will not output a signal when the air-fuel mixture is leaner than stoichiometric or when the exhaust temperature is less than 350° C. Although it may be possible to employ other types of sensors for the control, certain aspects of the control routine are particularly useful with this type of sensor. However, those skilled in the art will readily understand how the arrangement can be employed in connection with other types of sensors; for example, sensors which emit a detection signal when the fuel-air mixture is leaner than the theoretical stoichiometric ratio for a given engine running condition.

Basically, the ECU 84 is programmed so as to adjust the amount of air bleed by the air bleed control valve 74 by actuating the stepper motor 76 in response to output signals from the sensor 87 once it is at its operating temperature. Basically, the system is designed so that upon initial start-up and with all new components, the valve 74 will be positioned at a point that is at approximately one-half of its total travel, i.e., at its 50-percent position, as shown in FIG. 3. FIG. 3 shows in broken-line curve the optimum or stoichiometric amount of fuel flow q in response to air intake flow Q for propane. This broken line is the λ1 condition. The carburetor 22 is adjusted and jetted so as to attempt to maintain this ratio as close as possible when the valve 74 is set at its 50-percent position, as shown in FIG. 3 by the 50-percent curve B. Thus, if the air-fuel ratio varies on either side (rich or lean) from the line B, the stepper motor 76 is actuated accordingly so as to maintain the air-fuel ratio at the λ1 condition. This curve also shows the relationship of air-fuel ratios that will exist when the valve 74 is fully closed (curve A, zero percent) or fully opened (curve C, 100 percent).

The dot-dash line curve of FIG. 3 shows the stoichiometric ratio if the fuel employed is primarily butane, as opposed to propane, but the same principle would apply.

After the engine has run for some time period and/or as the components wear, the air-fuel ratio will drift slightly, although the feedback control will still maintain the air bleed valve 74 in a condition to maintain the λ1 situation. This is shown in FIG. 4, wherein the system drifts toward the rich side, and hence, additional air bleed is required. It will be seen that if this condition prevails, then the stepper motor 76 may not have a sufficient range of movement to maintain the λ1 condition under all running conditions. Therefore, in accordance with an embodiment of the invention, the system is provided with a manually adjustable bypass system so as to make adjustments and bring the condition as shown in FIG. 4 back into the condition as shown in FIG. 5 by bleeding either less or more air into the system, depending upon the direction of drift.

Figure 2:
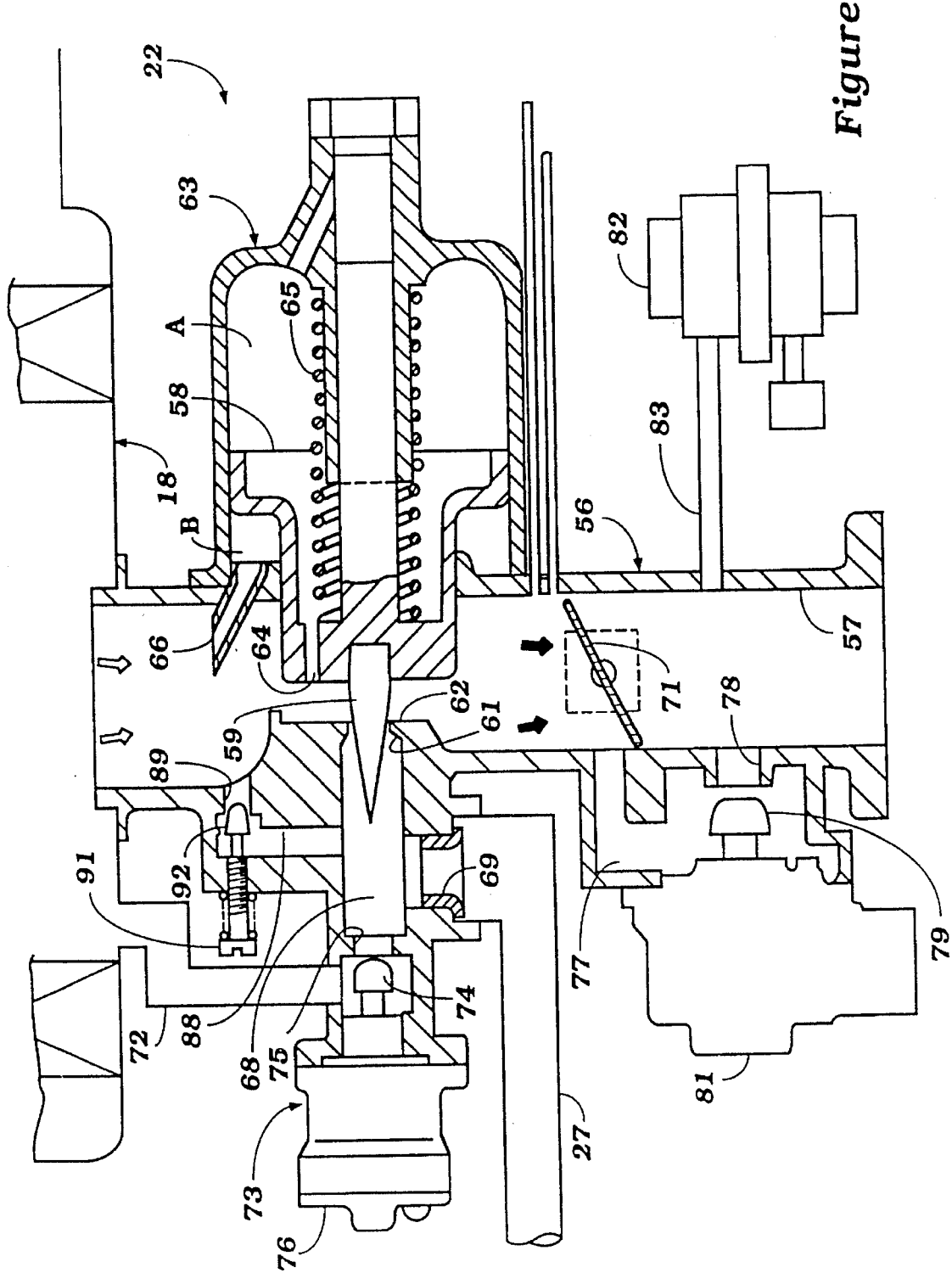
FIG. 2 is an enlarged cross-sectional view taken through the charge former and certain auxiliary components therefor.

This bleed system includes, as shown in FIGS. 1 and 2, an air bleed passage 88 that extends from an inlet port 89 positioned upstream in the induction passage 57 from the sliding piston 58 and downstream from the air cleaner 18. This air bleed passage 88 communicates with the mixing chamber 68. A manually adjustable valve 91 having a valving element 92 cooperates with the bleed opening 89 so as to control the amount of air bled manually into the system. This adjustment of the valve 91 is done only infrequently and may be done either manually, or if desired, an automatic adjustment mechanism may be incorporated, which actuates at predetermined mileage or time intervals. However, this adjustment of the valve 91 is not something that is done continuously during the engine operation, but is only done during service intervals or when the wear of the system or its age requires adjustment.

One actual procedure whereby this adjustment may be made is to run the engine in a hot idle condition and allow the stepper motor 76 to move the valve element 74 to obtain the λ1 condition. If this movement involves positioning other than at the mid-position, then by opening or closing the bleed valve 94, the system can be adjusted to bleed in either less or more additional air so that on the feedback control the stepper motor 76 will position the valve 74 in the 50-percent position to maintain the λ1 condition. When this has been accomplished, then the appropriate adjustment will have been made and need not be made again until after a fairly long time period.

Figure 6:
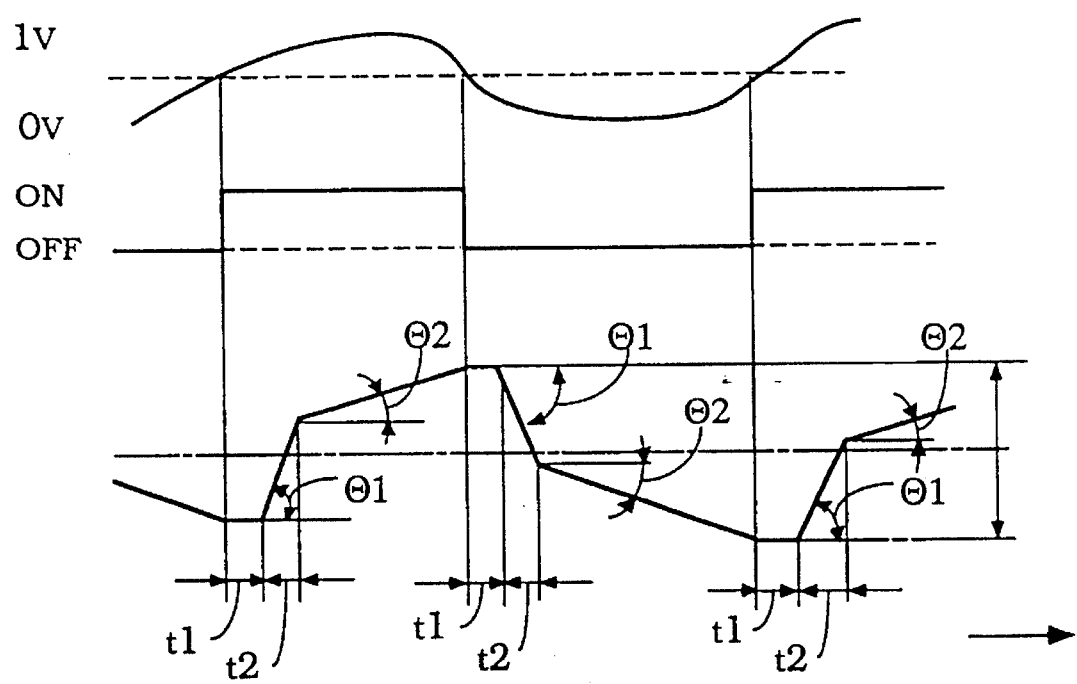
FIG. 6 is a graphical view showing time, the operating condition of the sensor, the actual sensor output, and the control of the automatically operated bleed valve.

FIG. 6 is a graphical view showing how the control routine follows for a given running condition of the engine and how the stepper motor 73 is actuated to maintain the desired set value and the λ1 condition. As has been noted, the oxygen sensor 87 is such that it will output a signal only when the mixture is stoichiometric or richer, and hence, will not provide an actual signal of the actual oxygen content.

The first curve shows the actual output of the oxygen sensor in terms of voltage, and it can vary from zero volts when the sensor is not operating to a total of one volt. When the voltage increases to approximately 50 mv, then the sensor is deemed to be on by the ECU 84, and the stepper motor 73 is generated so as to cause a leaning of the fuel-air mixture in a step increment. However, initially the stepper motor is held in position for a fixed time interval t1. After this time interval, if the sensor is still on, then the stepper motor is advanced rapidly through a number of steps through a time interval t2 at a rate shown by the slope of the curve θ1. If, after the time t2, the output of the oxygen sensor is still deemed to be on, then the mixture is further leaned by operating the stepper motor 73 in an opening direction but at a lower rate, as shown by the sloped θ2 until the switch is turned off.

If the sensor then turns off, the stepper motor is operated in the opposite direction to enrich the mixture by rapidly closing the bleed valve 74 after the time period t1 along the slope θ1. If at the end of the time period t2 the sensor is still switched off, then the stepper motor is again moved in a leaning direction (valve open) but at the lower rate θ2.

Thus, for a normal cycle of operation it is possible to determine the average or standard stepper motor position, which is the average of the distance G, as shown in this figure. This value is recorded in a memory and can be utilized for certain conditions when the condition or output of the oxygen sensor 87 is not operative. For example, during cold starting and before the oxygen sensor 87 reaches its operating position, the bleed valve 74 can be set in the position determined by the memorized value G observed at the last time the engine was running normally. In the cases where it is desired to run lean, the step valve can be increased by a multiple, such as 1.05 to implement lean running operation. There is another condition when the stored memorized value may be employed, and this is during recovery from rapid decelerations. For example, it has been described that the fuel supply can be cut off under extreme decelerations by operating the fuel cut control 83 and shutting the fuel control valve 26. When this happens, however, the feedback control will also sense a lean running, and in an effort to maintain a λ1 condition, the stepper motor 76 would be operated to close the bleed control valve 74 and provide a richer fuel-air mixture. Hence, when the engine is returned to normal operation, the air-fuel ratio will be too rich, and poor emission control and fuel economy will result. Hence, during this condition the ECU can be programmed to move the stepper motor 73 and bleed control valve 74 to the most recently stored mid-range G value to avoid an overly rich mixture on resumption of fuel supply when the deceleration condition has passed.

From the foregoing description, it should be readily apparent that the described embodiment of the invention provides a simplified feedback control which nevertheless maintains the capability of compensating for and maintaining λ1 conditions, even if the system deteriorates either due to age or carbon buildups by providing a manual bleed control that can be operated either manually or automatically, but only at long time intervals. Also, by memorizing certain standard settings for the bleed valve under normal running conditions, other conditions when the exhaust sensor would not be reliable for feedback control can be accomplished. Of course, the foregoing description is that of a preferred embodiment of the invention, and various changes and modifications may be made without departing from the spirit and scope of the invention, as defined by the appended claims.

We claim:

1. A gaseous fueled engine having an induction system including a charge former supplying a fuel-air mixture to said engine and comprising an air induction passage for receiving atmospheric air and a fuel supply circuit for receiving gaseous fuel from a source of gaseous fuel stored under pressure and mixing said fuel with the air in said induction passage for forming a fuel-air mixture for said engine, an air bleed passage communicating an atmospheric air inlet with said fuel supply circuit, an automatic air bleed control valve in said air bleed passage for controlling the amount of air bleed into said fuel supply circuit to control the mixture strength, an engine combustion sensor for detecting the air-fuel ratio, feedback control means for receiving the signal from said engine combustion sensor and controlling said automatic air bleed valve to maintain the desired air-fuel ratio, an air bypass circuit for bypassing atmospheric air to said fuel supply circuit independently of said air bleed passage, and valve means for controlling the air flow through said air bypass circuit and adjustable to maintain the desired rate of control in response to changes in the system due to deterioration.

2. A gaseous fueled engine as in claim 1, wherein the air bypass control valve is manually operated.

3. A gaseous fueled engine as in claim 1, wherein the charge former is an air valve-type carburetor having a pressure-controlled valve in the induction passage for maintaining a constant pressure drop thereacross and a main fuel metering valve operably connected to said air valve for controlling the rate of discharge of the fuel mixture into the induction passage.

4. A gaseous fueled engine as in claim 3, wherein the air bypass control valve is manually operated.

5. A gaseous fueled engine as in claim 4, wherein the engine combustion sensor comprises an oxygen sensor.

6. A gaseous fueled engine as in claim 1, wherein the feedback control means memorizes the most recent position of the stepper motor for a given running condition.

7. A gaseous fueled engine as in claim 6, wherein the memorized value is employed for engine control at a time when the engine combustion sensor may not be indicative of actual engine conditions.

8. A gaseous fueled engine as in claim 7, wherein the memorized value is employed on cold starting until the oxygen sensor is at its normal operating temperature.

9. A gaseous fueled engine as in claim 7, wherein a fuel cut-off valve is provided for cutting off the supply of fuel to the fuel discharge circuit from the fuel supply in response to extreme decelerations.

10. A gaseous fueled engine as in claim 9, wherein the memorized value is employed for controlling the position of the air bleed valve during the deceleration condition.

11. A gaseous fueled engine having an induction system including a charge former for supplying a fuel-air mixture to said engine and comprising an air induction passage for receiving atmospheric air and a fuel supply circuit for receiving gaseous fuel from a source of gaseous fuel stored under pressure and mixing said fuel with the air in said induction passage to form a fuel-air mixture for said engine, an air bleed passage communicating an atmospheric air inlet with said fuel supply circuit, an automatic air bleed valve in said air bleed passage for controlling the amount of air bled into said fuel supply circuit to control the mixture strength, an engine combustion sensor for detecting the fuel-air ratio, feedback control means for controlling the position of said air bleed valve in response to the output of said engine combustion sensor for maintaining the desired fuel-air ratio by adjusting the air bleed valve position, and means for memorizing the position of said air bleed valve for given engine running conditions.

12. A gaseous fueled engine as in claim 11, wherein the measured value is employed for engine control at a time when the engine combustion sensor may not be indicative of actual engine conditions.

13. A gaseous fueled engine as in claim 12, wherein the memorized value is employed on cold starting until the oxygen sensor is at its normal operating temperature.

14. A gaseous fueled engine as in claim 12, wherein a fuel cut-off valve is provided for cutting off the supply of fuel to the fuel discharge circuit from the fuel supply in response to extreme decelerations.

15. A gaseous fueled engine as in claim 14, wherein the memorized value is employed for controlling the position of the air bleed valve during the deceleration condition.

16. A gaseous fueled engine as in claim 11, wherein the charge former is an air valve-type carburetor having a pressure-controlled valve in the induction passage for maintaining a constant pressure drop thereacross and a main fuel metering valve operably connected to said air valve for controlling the rate of discharge of the fuel mixture into the induction passage.

17. A gaseous fueled engine as in claim 16, wherein the measured value is employed for engine control at a time when the engine combustion sensor may not be indicative of actual engine conditions.

18. A gaseous fueled engine as in claim 17, wherein the memorized value is employed on cold starting until the oxygen sensor is at its normal operating temperature.

19. A gaseous fueled engine as in claim 17, wherein a fuel cut-off valve is provided for cutting off the supply of fuel to the fuel discharge circuit from the fuel supply in response to extreme decelerations.

20. A gaseous fueled engine as in claim 19, wherein the memorized value is employed for controlling the position of the air bleed valve during the deceleration condition.

21. A method of operation a gaseous fueled engine having an induction system including a charge former supplying a fuel-air mixture to said engine and comprising an air induction passage for receiving atmospheric air and a fuel supply circuit for receiving gaseous fuel from a source of gaseous fuel stored under pressure and mixing said fuel with the air in said induction passage for forming a fuel-air mixture for said engine, an air bleed passage communicating an atmospheric air inlet with said fuel supply circuit, an automatic air bleed control valve in said air bleed passage for controlling the amount of air bleed into said fuel supply circuit to control the mixture strength, an engine combustion sensor for detecting the air-fuel ratio, said method comprising employing feedback control for receiving the signal from said engine combustion sensor and controlling said automatic air bleed valve to maintain the desired air-fuel ratio, providing an air bypass circuit for bypassing atmospheric air to said fuel supply circuit independently of said air bleed passage, and controlling the air flow through said air bypass circuit to maintain the desired rate of control in response to changes in the system due to deterioration.

22. A method of operating a gaseous fueled engine as in claim 21, wherein the air bypass is manually operated.

23. A method of operating a gaseous fueled engine as in claim 21, wherein the charge former is an air valve-type carburetor having a pressure-controlled valve in the induction passage for maintaining a constant pressure drop thereacross and a main fuel metering valve operably connected to said air valve for controlling the rate of discharge of the fuel mixture into the induction passage.

24. A method of operating a gaseous fueled engine as in claim 23, wherein the air bypass is manually operated.

25. A method of operating a gaseous fueled engine as in claim 24, wherein the engine combustion sensor comprises an oxygen sensor.

26. A method of operating a gaseous fueled engine as in claim 21, wherein the most recent position of the stepper motor for a given running condition is memorized.

27. A method of operating a gaseous fueled engine as in claim 26, wherein the memorized value is employed for engine control at a time when the engine combustion sensor may not be indicative of actual engine conditions.

28. A method of operating a gaseous fueled engine as in claim 27, wherein the memorized value is employed on cold starting until the oxygen sensor is at its normal operating temperature.

29. A method of operating a gaseous fueled engine as in claim 27, wherein the supply of fuel to the fuel discharge circuit from the fuel supply in response to extreme decelerations.

30. A method of operating a gaseous fueled engine as in claim 29, wherein the memorized value is employed for controlling the position of the air bleed valve during the deceleration condition.

31. A method of operating a gaseous fueled engine having an induction system including a charge former for supplying a fuel-air mixture to said engine and comprising an air induction passage for receiving atmospheric air and a fuel supply circuit for receiving gaseous fuel from a source of gaseous fuel stored under pressure and mixing said fuel with the air in said induction passage to form a fuel-air mixture for said engine, an air bleed passage communicating an atmospheric air inlet with said fuel supply circuit, an automatic air bleed valve in said air bleed passage for controlling the amount of air bled into said fuel supply circuit to control the mixture strength, an engine combustion sensor for detecting the fuel-air ratio, said method comprising the steps of controlling the position of said air bleed valve in response to the output of said engine combustion sensor for maintaining the desired fuel-air ratio by adjusting the air bleed valve position, and memorizing the position of said air bleed valve for given engine running conditions.

32. A method of operating a gaseous fueled engine as in claim 31, wherein the measured value is employed for engine control at a time when the engine combustion sensor may not be indicative of actual engine conditions.

33. A method of operating a gaseous fueled engine as in claim 32, wherein the memorized value is employed on cold starting until the oxygen sensor is at its normal operating temperature.

34. A method of operating a gaseous fueled engine as in claim 32, wherein the supply of fuel to the fuel discharge circuit from the fuel supply in response to extreme decelerations.

35. A method of operating a gaseous fueled engine as in claim 34, wherein the memorized value is employed for controlling the position of the air bleed valve during the deceleration condition.

36. A method of operating a gaseous fueled engine as in claim 31, wherein the charge former is an air valve-type carburetor having a pressure-controlled valve in the induction passage for maintaining a constant pressure drop thereacross and a main fuel metering valve operably connected to said air valve for controlling the rate of discharge of the fuel mixture into the induction passage.

37. A method of operating a gaseous fueled engine as in claim 36, wherein the memorized value is employed for engine control at a time when the engine combustion sensor may not be indicative of actual engine conditions.

38. A method of operating a gaseous fueled engine as in claim 37, wherein the memorized value is employed on cold starting until the oxygen sensor is at its normal operating temperature.

39. A method of operating a gaseous fueled engine as in claim 37, wherein the supply of fuel to the fuel discharge circuit from the fuel supply in response to extreme decelerations.

40. A method of operating a gaseous fueled engine as in claim 39, wherein the memorized value is employed for controlling the position of the air bleed valve during the deceleration condition.

* * * * *